United States Patent
Paul et al.

[15] 3,658,581
[45] Apr. 25, 1972

[54] COATING FOR CONDENSER SURFACES

[72] Inventors: Roy D. Paul, Windsor; Edwin W. Blocker, Warehouse Point, both of Conn.

[73] Assignee: United Aircraft Corporation, East Hartford, Conn.

[22] Filed: Aug. 1, 1969

[21] Appl. No.: 846,918

[52] U.S. Cl. ..........................117/169 R, 117/129, 203/86, 202/185 R
[51] Int. Cl. ..........................................................C03c 7/00
[58] Field of Search ........................117/169 A, 129; 203/86; 202/185 R

[56] References Cited

UNITED STATES PATENTS

| | | | |
|---|---|---|---|
| 3,091,577 | 5/1963 | Pequignot | 203/86 X |
| 3,206,381 | 9/1965 | Neugebauer et al. | 203/86 X |

*Primary Examiner*—Alfred L. Leavitt
*Assistant Examiner*—Wayne F. Cyron
*Attorney*—Richard N. James

[57] ABSTRACT

Coatings for the heat transfer surfaces of condensers are formulated to provide wetting of the surfaces by the condensate and wicking thereon and, thus, to effect the condensation process, including condensate collection, with a minimum pressure loss. The coatings are passive in nature and include particulate silica or calcium silicate dispersed in water insoluble, non-crystalline glassy binders, particularly insolubilized potassium silicate or lead borosilicate glass.

13 Claims, No Drawings

COATING FOR CONDENSER SURFACES

BACKGROUND OF THE INVENTION

The present invention relates in general to coatings and, more particularly, to coatings for the heat transfer surfaces of condensers for wetting and wicking purposes.

A measure of the efficiency of any condenser may in part be made as a function of the pressure loss incurred therein in the condensation process particularly insofar as pumping power requirements are concerned. The pressure loss can be reduced if either the condensate is caused to form as non-adherent droplets which may easily be blown across the heat transfer surfaces, or if the condensate can be caused to form as a thin, spreading film which may be easily collected.

For satisfactory non-adherent droplet formation, the surface energy of the heat transfer surfaces must be reduced considerably below the value of the surface energy of the condensate and the droplet must form with a contact angle with these surfaces greater than about 135°. This may be accomplished by coating the surfaces with a hydrophobic coating material having a surface energy on the order of one-third that of the liquid. Suitable coatings of this general nature are described in the patent to Buckingham U.S. Pat. No. 2,923,640.

In order to provide spreading, thin-film condensation, a contact angle of the droplet with the condensing surface of about 0° is desired. This can be accomplished by either lowering the surface energy of the liquid below that of the heat transfer surfaces or by increasing the condensing surface energy above that of the liquid. For these purposes a surfactant may be added to the liquid or an active coating may be utilized which reacts with and dissolves in the condensate and thereby reduces its surface energy to a level low enough to effect the desired spread of the condensate. Because the active coatings involve a reaction with the condensate, they are progressively expended during the condensation process.

SUMMARY OF THE INVENTION

The present invention relates to passive coatings to effect wetting and wicking on the heat transfer surfaces of condensers.

The coatings described herein provide the desired wicking function as a result of the chemical polarity of uncoated silica, or calcium silicate, particles dispersed throughout the coating, the silica particles exhibiting a polar attraction for the hydroxyl ions in the condensed water, this attractive force causing a breakdown in the condensate whereby it is caused to form as a thin film which spreads in the direction of adjacent silica particles. The uncoated silica is dispersed in water insoluble, non-crystalline glassy binders such as insolubilized potassium silicate or lead borosilicate glass.

In one preferred embodiment, a formulation comprising, by weight, 125 parts silica, 12 parts zinc oxide, 222 parts potassium silicate and 500 parts water is applied as a slurry to the condenser heat transfer surfaces; allowed to air dry; cured at a temperature not exceeding about 500°F; and activated by immersion in boiling water.

In another preferred embodiment, a formulation comprising, by weight, 100 parts silica, 100 parts lead borosilicate glass frit, 5.8 parts boric acid, 5.2 parts potassium hydroxide, 3.9 parts sodium silicate and 150 parts water is applied as a slurry to the condenser heat transfer surfaces; allowed to air dry; cured at a temperature not exceeding about 1,050°F; and activated by immersion in boiling water.

The coatings thus provided are thin and continuous; have good adhesion and stability to water vapor; and are characterized by excellent wetting and spreading properties.

DESCRIPTION OF THE PREFERRED EMBODIMENTS

The basic development from which the present invention evolved was directed to the provision of wetting and wicking coatings for the nickel, aluminum and stainless steel alloys, particularly for use in connection with low pressure drop condensers. In terms of basic composition, the developed coatings utilize particulate silica or calcium silicate dispersed in a non-crystalline glassy binder.

For application to the nickel-base and aluminum-base alloys, a preferred insolubilized potassium silicate coating composition is formulated as follows:

| Materials | Parts by weight |
| --- | --- |
| Silica | 125 |
| Zinc oxide | 12 |
| Potassium oxide | 222 |
| Water | 500 |

For application to the stainless steel alloys, the preferred insolubilized potassium silicate compositions are:

| Materials | Parts by weight | |
| --- | --- | --- |
| | (1) or (2) | |
| Potassium Silicate | 78 | 78 |
| Sodium silicofluoride | 15 | — |
| Barium silicofluoride | — | 15 |
| Silica | — | 44 |
| Calcium silicate | 44 | — |
| Sodium hydroxide | 24 | 19 |
| Water | 243 | 226 |

For application to the stainless steel, nickel and aluminum-base alloy, a preferred vitreous enamel coating composition is formulated as follows:

| Materials | Parts by Weight |
| --- | --- |
| Silica | 100 |
| Lead borosilicate glass frit (Ferro Corporation AL-2 Frit) | 100 |
| Boric acid | 5.8 |
| Potassium hydroxide | 5.2 |
| Sodium silicate "0" | 3.9 |
| Water | 150 |

In all of these formulations, a starting size of 10–75 microns is desired for the silica, generally in a weight range of 25–75 percent silica on a dry basis with the vitreous enamel binder, and a weight range of 35–75 percent silica with the potassium silicate binder. The lower end of the silica or calcium silicate range is determined by the particle to particle spacing required to effect a reasonable spread of the condensate on the wetted surfaces. Of course, maximum wicking with minimum flow and heat transfer resistance is desirable. A suitable test to determine satisfactory wicking is to dip the edge of a coated panel into the condensate and to measure the rise of condensate thereon vertically from the surface of the condensate. A rise of at least 1 ½ inches is preferred. The upper usable limit of particulate silica is determined primarily by the sufficiency of binder to provide the desired adherence.

In these formulations, the basic wetting and wicking characteristics are imparted by the uncoated silica or calcium silicate particles. Thus, these materials are the constituents providing the desired very high surface energy or polarity to the coating. A high hydrophilic polar surface induces a low interfacial energy between the condensate and the surface thereby effecting the desired wetting and wicking. The potassium silicate or lead borosilicate glass frit serves as the matrix or enamel in which the particulate silica is dispersed and which provides desired uniformity of coverage and adherence. In the as-coated condition, the binder comprises a mixture of inorganic oxides providing a non-crystalline, glassy film having good adherence to the metallic substrates.

The zinc oxide is added to the coating mix to convert the potassium silicate binder from a water soluble to a water insoluble material. Other suitable insolubilizers for potassium silicate include the silicofluorides ($SiF_6$) of sodium, potassium, barium and magnesium, the quantity of insolubilizer in general determining the colloidal properties of the coating. As necessary, particularly with the silicofluoride insolubilizers, sodium hydroxide has been used as a colloidal dispersant. The vitreous enamel frit is rendered insoluble simply by heat treatment. Similarly, water, or some other readily vaporized liquid such as alcohols or ketones, compatible with the mix, is utilized to form a slurry for ease of application to the surfaces to be coated. In general, the more viscous slurries will provide the thicker coatings and the less viscous slurries the thinner coatings. However, satisfactory wetting and wicking are provided with very thin coatings and, therefore, the thin coatings are normally preferred particularly insofar as they provide the minimum resistance to heat transfer in the condensation operation.

Of course the adherence of the coating is dependent to a great extent upon the cleanliness of the metallic surfaces to which they are applied, so the typical cleaning and degreasing operations are utilized to precondition the surfaces for the coating. Furthermore, inasmuch as the adherence of inorganic coatings of this nature may be affected by the surface finish of the substrate, the provision of a matte, or slightly roughened, finish is preferred. In this regard, a suitable etchant for the nickel-base alloys comprises a formulation, by volume, of 23 percent nitric acid, 4 percent hydrofluoric acid, balance water. For the stainless steel alloys, the formulation used was, by volume, 30 percent nitric acid, 3 percent hydrofluoric acid, balance water, held at 160°–180°F.

When coating aluminum, in addition to the preliminary cleaning and etching sequences, it has been found that an acid metal salt-type conversion coating used as a pretreatment before application of the wetting and wicking film is a definite aid to insolubilization of the potassium silicate binder. Accordingly, it has been the practice to first coat the aluminum with the conversion coating which may be chromic acid Alodine 1200 (Chromate type) or aluminum phosphate Alodine 401–41 (Phosphate type), which is partially sealed in water at 120°–150°F for 20–30 seconds. If the conversion coating is utilized, the wetting coating should be applied within about 15 minutes of the curing operation. The use of conversion coatings is described in detail in Mil–C–5541 A "Chemical Film and Chemical Film Materials for Aluminum and Aluminum Alloys."

Typically, pretreated substrates have been coated by a dipping technique utilizing the hereinbefore described slurries. The resultant pickup coating is allowed to air dry followed by curing for one hour at a temperature up to about 500°F for coatings utilizing potassium silicate as a binder. The coatings with vitreous enamel frit binder material require curing for 15–30 minutes at a temperature up to about 1,050°. The cured coated articles are then immersed in boiling water for about 30 minutes to activate the coating.

The invention and particular preferred embodiments thereof have been described in detail in accordance with the patent statutes. It will be understood, however, that the specific examples are intended to be illustrative only. The invention in its broader aspects is not limited to the exact details described, for obvious modifications will occur to those skilled in the art.

What is claimed is:

1. A coating for the heat transfer surfaces of a condenser to provide wetting thereof by and wicking of the condensate which comprises:
   a non-crystalline glassy binder adherent to the heat transfer surfaces as a thin adherent film, the binder consisting essentially of a glass formed of a mixture of inorganic oxides which are insoluble in the condensate;
   and an inorganic wetting and wicking compound uniformly dispersed in the binder, the compound consisting of particulate silica or calcium silicate or mixtures thereof.

2. The coating according to claim 1 wherein:
   the binder is insolubilized potassium silicate.

3. The coating according to claim 1 wherein:
   the binder is a pure lead borosilicate glass.

4. The coating according to claim 3 wherein:
   the wetting and wicking compound is silica.

5. The coating according to claim 3 wherein:
   the condensate is water.

6. The method of improving the efficiency of water vapor removal from a gas stream by condensation in a heat exchanger which comprises:
   coating the heat transfer surfaces of the heat exchanger with a mixture consisting of particulate silica or calcium silicate dispersed in a non-crystalline glassy binder comprising a mixture of inorganic oxides suspended in a vaporizable dispersant;
   and drying the coating and forming the binder as water insoluble, continuous film firmly adherent to the surfaces.

7. The method of providing condensate wetting and wicking in a water condenser which comprises:
   coating the heat transfer surfaces with a mixture consisting essentially of particulate silica, calcium silicate, or mixtures thereof, dispersed in an aqueous slurry of potassium silicate containing a potassium silicate insolubilizer;
   drying the coating;
   and heat treating the coating to insolubilize the potassium silicate and form it as a thin, continuous film adherent to the surfaces.

8. The method according to claim 3 wherein:
   the insolubilizer is selected from the group consisting of zinc oxide and the silicofluorides of sodium, potassium, barium, and magnesium.

9. The method according to claim 8 wherein:
   the coating mixture consists essentially of, by weight, about 125 parts silica, about 12 parts zinc oxide, about 225 parts potassium silicate, together with sufficient water to form a slurry.

10. The method of providing condensate wetting and wicking in a water condenser which comprises:
    coating the heat transfer surfaces with a mixture consisting essentially of particulate silica, calcium silicate, or mixtures thereof, dispersed in an aqueous slurry of lead borosilicate glass frit;
    drying the coating;
    and curing the coating and forming it as a thin, continuous film adherent to the surfaces.

11. The method according to claim 10 wherein:
    the coating mixture consists essentially of; by weight, about 100 parts silica, about 100 parts lead borosilicate glass frit, about 6 parts boric acid, about 5 parts potassium hydroxide, about 4 parts sodium silicate together with sufficient water to form a slurry.

12. In a method of improving the efficiency of transformation of water from one fluid species into another fluid species in a heat exchanger, the steps which comprises:
    coating the heat transfer surfaces of the heat exchanger with a mixture consisting of particulate silica or calcium silicate dispersed in a non-crystalline glassy binder comprising a mixture of inorganic oxides suspended in a vaporizable dispersant;
    and drying the coating and forming the binder as a water insoluble, continuous film firmly adherent to the surfaces.

13. In a method of improving the efficiency of transformation of water from one fluid species into another fluid species in a heat exchanger, the steps which comprises:
    coating the heat transfer surfaces with a mixture consisting essentially of particulate silica, calcium silicate, or mixtures thereof, dispersed in an aqueous slurry of potassium silicate containing a potassium silicate insolubilizer or pure lead borosilicate glass;
    drying the coating;
    and heat treating the coating to insolubilize the potassium silicate and form it as a thin, continuous film adherent to the surfaces.

* * * * *